(12) United States Patent
Zhou et al.

(10) Patent No.: US 11,093,857 B2
(45) Date of Patent: Aug. 17, 2021

(54) METHOD AND APPARATUS FOR GENERATING INFORMATION

(71) Applicant: Baidu Online Network Technology (Beijing) Co., Ltd., Beijing (CN)

(72) Inventors: Jingbo Zhou, Beijing (CN); Mengwen Xu, Beijing (CN); Yuan Xia, Beijing (CN); Haishan Wu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 994 days.

(21) Appl. No.: 15/718,927

(22) Filed: Sep. 28, 2017

(65) Prior Publication Data
US 2018/0285779 A1    Oct. 4, 2018

(30) Foreign Application Priority Data
Mar. 30, 2017    (CN) .......................... 201710202303.5

(51) Int. Cl.
| | |
|---|---|
| G06N 20/00 | (2019.01) |
| G06F 5/01 | (2006.01) |
| G06F 17/16 | (2006.01) |
| G06F 16/29 | (2019.01) |
| G06F 16/28 | (2019.01) |
| G06F 16/9537 | (2019.01) |

(52) U.S. Cl.
CPC ............... *G06N 20/00* (2019.01); *G06F 5/01* (2013.01); *G06F 16/285* (2019.01); *G06F 16/29* (2019.01); *G06F 16/9537* (2019.01); *G06F 17/16* (2013.01)

(58) Field of Classification Search
CPC ..................................................... G06N 20/00
See application file for complete search history.

(56) References Cited

U.S. PATENT DOCUMENTS

2013/0226857 A1* 8/2013 Shim ..................... H04W 4/029
                                                                706/52

FOREIGN PATENT DOCUMENTS

| CN | 106156583 A | 11/2016 |
|---|---|---|
| CN | 106506705 A | 3/2017 |

* cited by examiner

*Primary Examiner* — Daniel C Puentes
(74) *Attorney, Agent, or Firm* — Nixon Peabody LLP

(57) ABSTRACT

A method and apparatus for generating information. A specific embodiment of the method includes: acquiring a set of geographic information point sequences and a set of identifiers comprising an identifier of each geographic information point sequence in the set of the geographic information point sequences; for the each geographic information point sequence in the set of the geographic information point sequences, clustering geographic information points in the each geographic information point sequence and generating an element sequence corresponding to the each geographic information point sequence; learning, by utilizing a machine learning method based on the set of identifiers and the generated element sequences, to obtain a matrix for the identifiers in the set of identifiers; and generating, for each identifier in the set of identifiers, based on the identifier and the matrix, information of a user to which the geographic information point sequence indicated by the identifier belongs. The present embodiment realizes a targeted information generation.

15 Claims, 3 Drawing Sheets

METHOD AND APPARATUS FOR GENERATING INFORMATION

CROSS-REFERENCE TO RELATED APPLICATION

This application is related to and claims priority from Chinese Application No. 201710202303.5, filed on Mar. 30, 2017 and entitled "Method and Apparatus for Generating Information", the entire disclosure of which is hereby incorporated by reference.

TECHNICAL FIELD

The present disclosure relates to the field of computer technology, specifically to the field of Internet technology, and more specifically to a method and apparatus for generating information.

BACKGROUND

With the advent of mobile positioning devices, more and more track data of the user can be collected. Track data is widely considered to be capable of characterizing the user's behavior from multiple perspectives, and plays an important role in understanding the user's particularities and intentions. In addition, the information extracted from the track data for characterizing the user's particularities, intentions and the like may be applied to credit evaluation modeling, information pushing, etc.

However, the track data has the shortcomings such as unstructured, massive amount of data and undefined in semantics. For example, for a user, the track data of the user is only a string of coordinate points on a two-dimensional plane. It is difficult to directly extract the information of the user expressed by the track data. Therefore, how to effectively generate the user information to which the track data belongs based on the track data is a question worth studying.

SUMMARY

The objective of the present disclosure is to provide an improved method and apparatus for generating information, in order to solve the technical problem mentioned in the foregoing Background section.

In a first aspect, an embodiment of the present disclosure provides a method for generating information, comprising: acquiring a set of geographic information point sequences and a set of identifiers comprising an identifier of each geographic information point sequence in the set of the geographic information point sequences; for the each geographic information point sequence in the set of the geographic information point sequences, clustering geographic information points in the each geographic information point sequence and generating an element sequence corresponding to the each geographic information point sequence, wherein each element in the element sequence corresponds to at least one geographic information point in the each geographic information point sequence; learning, by utilizing a machine learning method based on the set of identifiers and the generated element sequences, to obtain a matrix for the identifiers in the set of identifiers; and generating, for each identifier in the set of identifiers, based on the identifier and the matrix, information of a user to which the geographic information point sequence indicated by the identifier belongs.

In some embodiments, the clustering geographic information points in the each geographic information point sequence and generating an element sequence corresponding to the each geographic information point sequence, for the each geographic information point sequence in the set of the geographic information point sequences, comprises: for the each geographic information point sequence in the set of the geographic information point sequences, for each geographic information point in the each geographic information point sequence, extracting a point of interest having a shortest distance to the each geographic information point from a pre-stored set of points of interest provided with identifiers, using an identifier of the point of interest as an element corresponding to the geographic information point, and using an element sequence comprising elements respectively corresponding to the geographic information points in the each geographic information point sequence as the element sequence corresponding to the geographic information point sequence.

In some embodiment, the clustering geographic information points in the each geographic information point sequence and generating an element sequence corresponding to the each geographic information point sequence, for the each geographic information point sequence in the set of the geographic information point sequences, comprises: for the each geographic information point sequence in the set of the geographic information point sequences, extracting region identifiers of regions where the geographic information points in the each geographical information point sequence are located from a preset set of region identifiers, and using a sequence comprising the extracted region identifiers as the element sequence corresponding to the each geographic information point sequence, wherein the preset set of the region identifiers includes a region identifier of a region where each geographic information point in the each geographical information point sequence is located.

In some embodiment, the clustering geographic information points in the each geographic information point sequence and generating an element sequence corresponding to the each geographic information point sequence, for the each geographic information point sequence in the set of the geographic information point sequences, comprises: for the each geographic information point sequence in the set of the geographic information point sequences, extracting grid identifiers of grids where the geographic information points in the each geographical information point sequence are located from a preset set of grid identifiers, and using a sequence comprising the extracted grid identifiers as the element sequence corresponding to the each geographic information point sequence, wherein the preset set of grid identifiers is a set of grid identifiers of grids divided by grid-partitioning a two-dimensional space in advance.

In some embodiments, the learning, by utilizing a machine learning method based on the set of identifiers and the generated element sequences, to obtain a matrix for the identifiers in the set of identifiers comprises: for each element sequence in the element sequences, using the each element sequence as a to-be-processed element sequence, using an identifier in the set of identifiers corresponding to the to-be-processed element sequence as a to-be-processed identifier and performing following processing steps: mapping the to-be-processed element sequence to a vector sequence and mapping the to-be-processed identifier to a vector to obtain an identifier vector; converting vectors in the vector sequence by utilizing a preset element converting matrix to obtain a first vector sequence, and converting the identifier vector by utilizing a preset identifier converting matrix to obtain a first identifier vector; and extracting at least one sub-vector sequence from the first vector sequence by performing following steps at least once: extracting continuously a preset number of vectors from the first vector sequence, right-shifting one bit and extracting continuously the preset number of vectors, and constructing a sub-vector sequence by using the extracted vectors; for each sub-vector sequence in the at least one sub-vector sequence, using vectors in the sub-vector sequence and an average value of the first identifier vector as a first vector associated with the sub-vector sequence, converting the first vector by utilizing a preset vector converting matrix to obtain a first converting vector, and predicting a value distribution of the first converting vector by a preset value distribution predicting model to optimize the preset identifier converting matrix, wherein the preset value distribution predicting model is used to characterize a corresponding relation between the first converting vector and the value distribution; and using the optimized preset identifier converting matrix as the matrix.

In some embodiments, the mapping the to-be-processed element sequence to a vector sequence and mapping the to-be-processed identifier to a vector to obtain an identifier vector comprises: mapping the to-be-processed element sequence to a vector sequence and mapping the to-be-processed identifier to a vector to obtain an identifier vector, by adopting One-Hot Encoding.

In a second aspect, the present disclosure provides an apparatus for generating information, comprising: an acquisition unit configured to acquire a set of geographic information point sequences and a set of identifiers comprising an identifier of each geographic information point sequence in the set of the geographic information point sequences; a first generating unit configured to, for the each geographic information point sequence in the set of the geographic information point sequences, cluster geographic information points in the each geographic information point sequence and generate an element sequence corresponding to the each geographic information point sequence, wherein each element in the element sequence corresponds to at least one geographic information point in the each geographic information point sequence; a learning unit configured to learn, by utilizing a machine learning method based on the set of identifiers and the generated element sequences, to obtain a matrix for the identifiers in the set of identifiers; and a second generating unit configured to generate, for each identifier in the set of identifiers, based on the identifier and the matrix, information of a user to which the geographic information point sequence indicated by the identifier belongs.

In some embodiments, the first generating unit comprises: a first generating subunit configured to, for the each geographic information point sequence in the set of the geographic information point sequences, for each geographic information point in the each geographic information point sequence, extract a point of interest having a shortest distance to the each geographic information point from a pre-stored set of points of interest provided with identifiers, use an identifier of the point of interest as an element corresponding to the geographic information point, and use an element sequence comprising elements respectively corresponding to the geographic information points in the each geographic information point sequence as the element sequence corresponding to the geographic information point sequence.

In some embodiments, the first generating unit comprises: a second generating subunit configured to, for the each geographic information point sequence in the set of the geographic information point sequences, extract region identifiers of regions where the geographic information points in the each geographical information point sequence are located from a preset set of region identifiers, and use a sequence comprising the extracted region identifiers as the element sequence corresponding to the each geographic information point sequence, wherein the preset set of the region identifiers includes a region identifier of a region where each geographic information point in the each geographical information point sequence is located.

In some embodiments, the first generating unit comprises: a third generating subunit configured to, for the each geographic information point sequence in the set of the geographic information point sequences, extract grid identifiers of grids where the geographic information points in the each geographical information point sequence are located from a preset set of grid identifiers, and use a sequence comprising the extracted grid identifiers as the element sequence corresponding to the each geographic information point sequence, wherein the preset set of grid identifiers is a set of grid identifiers of grids divided by grid-partitioning a two-dimensional space in advance.

In some embodiments, the learning unit comprises: a learning subunit configured to, for each element sequence in the element sequences, use the each element sequence as a to-be-processed element sequence, use an identifier in the set of identifiers corresponding to the to-be-processed element sequence as a to-be-processed identifier, and perform following processing steps: mapping the to-be-processed element sequence to a vector sequence and mapping the to-be-processed identifier to a vector to obtain an identifier vector; converting vectors in the vector sequence by utilizing a preset element converting matrix to obtain a first vector sequence, and converting the identifier vector by utilizing a preset identifier converting matrix to obtain a first identifier vector; and extracting at least one sub-vector sequence from the first vector sequence by performing following steps at least once: extracting continuously a preset number of vectors from the first vector sequence, right-shifting one bit and extracting continuously the preset number of vectors, and constructing a sub-vector sequence by using the extracted vectors; for each sub-vector sequence in the at least one sub-vector sequence, using vectors in the sub-vector sequence and an average value of the first identifier vector as a first vector associated with the sub-vector sequence, converting the first vector by utilizing a preset vector converting matrix to obtain a first converting vector, and predicting a value distribution of the first converting vector by a preset value distribution predicting model to optimize the preset identifier converting matrix, wherein the preset value distribution predicting model is used to characterize a corresponding relation between the first converting vector and the value distribution; and a matrix determining subunit configured to use the optimized preset identifier converting matrix as the matrix.

In some embodiments, the learning subunit comprises: a mapping module configured to map the to-be-processed element sequence to a vector sequence and map the to-be-processed identifier to a vector to obtain an identifier vector, by adopting One-Hot Encoding.

In a third aspect, an embodiment of the present disclosure provides a server comprising: one or more processors; and a storage configured to store one or more programs, which when executed by the one or more processors, cause the one or more processors to perform the method described by any one of the implementations in the first aspect.

In a fourth aspect, an embodiment of the present disclosure provides a computer readable storage medium storing a computer program, which when executed by a processor, causes the processor to perform the method described by any one of the implementations in the first aspect.

The method and apparatus for generating information provided by the embodiments of the present disclosure acquires a set of identifiers consisting of a set of geographic information point sequences and identifiers of each geographic information point sequence in the set of geographic information point sequences to cluster geographic information points of each of the geographic information point sequences in the set of geographic information point sequences, and generates an element sequence corresponding to the geographic information point sequence, then utilizing a machine learning method based on the set of identifiers and the generated element sequences, learns to obtain a matrix for each identifier in the set of identifiers, and finally based on each identifier in the set of identifiers and the matrix, generates information of a user to which the geographic information point sequence indicated by the identifier belongs, thereby effectively utilizing the information of the user's offline behavior (i.e., the set of geographic information point sequences and the set of identifiers) and the unsupervised machine learning method, realizing a targeted information generation.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
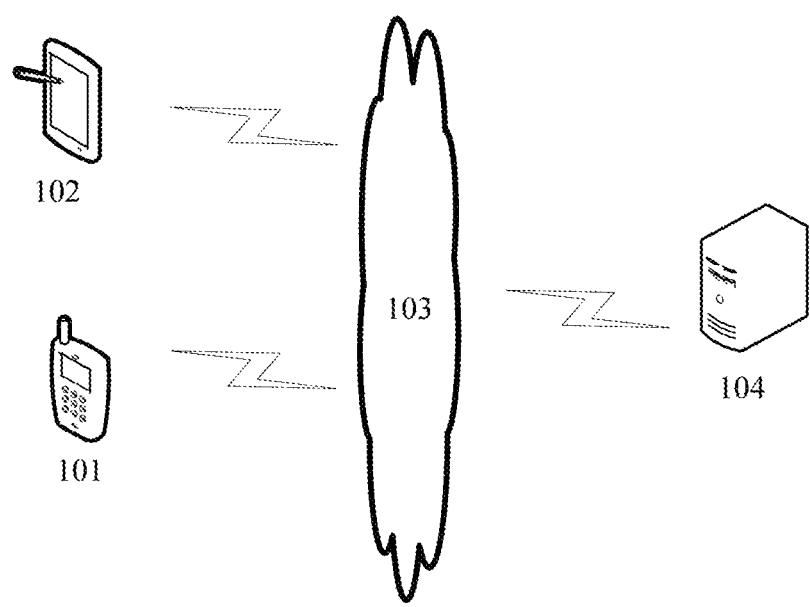
FIG. 1 is an exemplary system architecture diagram in which the present disclosure may be applied.

FIG. 1 shows an exemplary architecture of a system 100 which may be used by a method or apparatus for generating information according to the embodiments of the present application.

As shown in FIG. 1, the system architecture 100 may include terminal devices 101 and 102, a network 103 and a server 104. The network 103 serves as a medium providing a communication link between the terminal devices 101 and 102 and the server 104. The network 103 may include various types of connections, such as wired or wireless transmission links, or optical fibers.

The user may use the terminal devices 101 and 102 to interact with the server 104 through the network 103, in order to transmit or receive messages, etc. For example, the server 104 may transmit to the terminal devices 101 and 102 via the network 103 an instruction for transmitting location information, and the terminal devices 101 and 102 may transmit the location information of the user (such as a geographic information point sequence at a period and an identifier of the geographic information point sequence) to the server 104 via the network 103 in response to the instruction. Various client applications supporting a locating function, such as social applications, gaming applications, and locating applications, may be installed on the terminal devices 101 and 102.

The terminal devices 101 and 102 may be various electronic devices supporting the locating function, including but not limited to, smart phones, tablet computers, e-book readers, MP3 (Moving Picture Experts Group Audio Layer III) players, and MP4 (Moving Picture Experts Group Audio Layer IV) players.

The server 104 may be a server providing various services, for example, a server for processing the locating information of the user of the terminal devices 101 or 102, and storing the processing results (such as information of the user generated on the basis of the locating information) or transmitting the processing results to another server (not shown in FIG. 1) communicated with the server 104. The back-stage management server may perform a corresponding processing on data such as the received publishing information, and determine whether the user publishing the publishing information is a risky user.

It should be noted that the method for generating information according to the embodiments of the present application is generally executed by the server 104. Accordingly, the apparatus for generating information is generally installed on the server 104.

It should be appreciated that the numbers of the terminal devices, the networks and the servers in FIG. 1 are merely illustrative. Any number of terminal devices, networks and servers may be provided based on the actual requirements.

Figure 2:
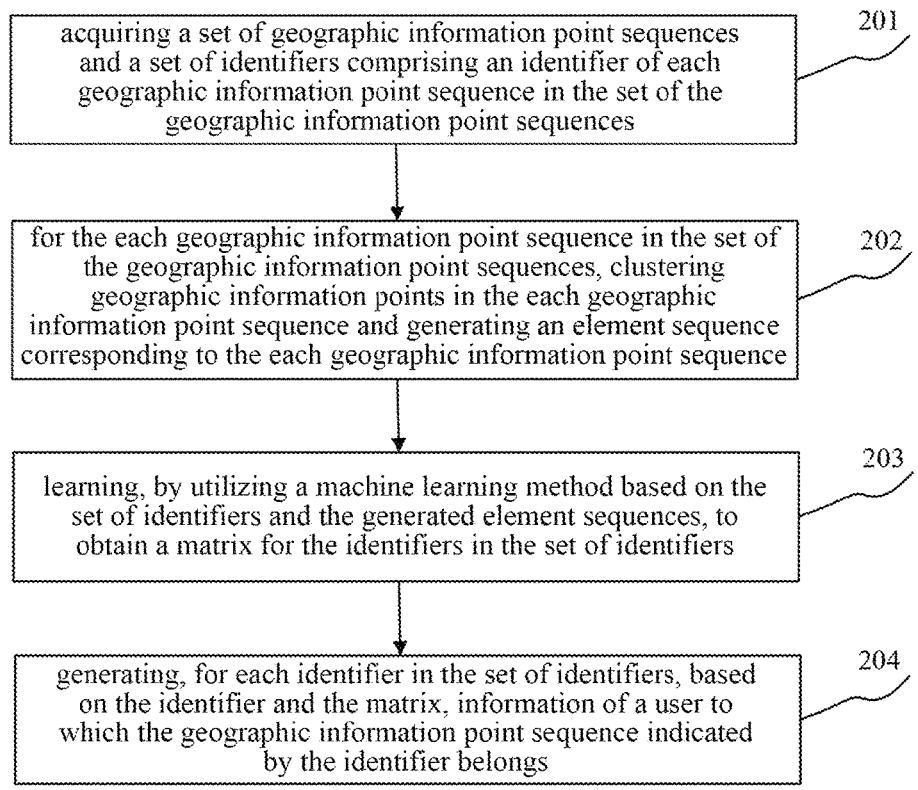
FIG. 2 is a flowchart of an embodiment of a method for generating information according to the present disclosure.

With further reference to FIG. 2, a flow 200 of an embodiment of a method for generating information according to the present disclosure is illustrated. The method for generating information includes the following steps:

Step 201, acquiring a set of geographic information point sequences and a set of identifiers comprising an identifier of each geographic information point sequence in the set of the geographic information point sequences.

In the present embodiment, the set of geographic information point sequences and the set of identifiers may be pre-stored locally in an electronic device (e.g., the server 104 as illustrated in FIG. 1) on which the method for generating information operate, or may be pre-stored in a server connected to the electronic device remotely, and the electronic device may acquire the set of geographic information point sequences and the set of identifiers from the local or the server. Here, the geographic information point sequence may be a sequence formed by coordinate points in a certain historical trajectory data of the user, or a sequence formed by coordinate points in a time period in the historical trajectory data. A geographic information point may characterize the location information of the user at a certain time point. It should be noted that the users to which each of the geographic information point sequences included in the set of geographic information point sequences respectively belong may be different from each other. For each geographic information point sequence in the set of geographic information point sequences, the identifier of the geographic information point sequence may be the user identifier of the user to which the geographic information point sequence belongs.

In some alternative implementations of the present embodiment, a terminal device (e.g., the terminal devices 101, 102 as illustrated in FIG. 1) connected to the electronic device may store the geographic information point sequence and the identifier of the geographic information point sequence of the user holding the terminal device. The electronic device may acquire the geographic information point sequence and the identifier of the geographic information point sequence from the connected terminal devices respectively to generate the set of geographic information point sequences and the set of identifiers.

Step 202, for each geographic information point sequence in the set of geographic information point sequences, clustering geographic information points in the geographic information point sequence and generating an element sequence corresponding to the geographic information point sequence.

In the present embodiment, after acquiring the set of geographic information point sequences and the set of identifiers, for each geographic information point sequence in the set of geographic information point sequences, the electronic device may cluster geographic information points in the geographic information point sequence and generate an element sequence corresponding to the geographic information point sequence. Here, each element in the element sequence corresponds to at least one geographic information point in the geographic information point sequence.

In the present embodiment, the electronic device may cluster the geographic information points in the geographic information point sequence according to the point of interest (POI), wherein the point of interest is provided with an identifier. For example, in the geographic information point sequence, the geographic information points corresponding to the same point of interest is classified into the same geographic information point group, with the identifier of the point of interest being the category label of the geographic information point group. The electronic device may generate a category label sequence with respect to the category labels determined for the geographic information point sequence, and determine the category label sequence as the element sequence corresponding to the geographic information point sequence. Here, the point of interest may be a coordinate point with a landmark site such as a gas station, a department store, a supermarket, a restaurant, a hotel, a convenience store, a hospital, a park, a station and a parking lot. It should be noted that the electronic device may introduce the geographic information point sequence into a pre-trained POI visit prediction model to predict points of interest corresponding to each geographic information point in the geographic information point sequence. Here, the POI visit prediction model may be used to characterize a corresponding relation between the geographic information point and the point of interest.

In some alternative implementations of the present embodiment, for each geographic information point sequence in the set of geographic information point sequences, for each geographic information point in the geographic information point sequence, the electronic device may extract a point of interest with the shortest straight-line distance to the geographic information point from a pre-stored set of points of interest wherein points of interest contained are provided with identifiers, and determine the identifier of the point of interest as an element corresponding to the geographic information point. The electronic device may determine an element sequence consisting of elements respectively corresponding to each geographic information point in the geographic information point sequence as the element sequence corresponding to the geographic information point sequence. Here, the elements contained in the element sequence may be different from each other. For example, the geographic information points included in a geographic information point sequence are in turn A1, A2, A3 and A4, the point of interest with the shortest straight-line distance to the geographic information points A1 and A2 is B1, the point of interest with the shortest straight-line distance to the geographic information point A3 is B2, the point of interest with the shortest straight-line distance to the geographic information point A4 is B3, the identifiers of the points of interest B1, B2 and B3 are respectively P1, P2 and P3, accordingly, the generated elements contained in the element sequence corresponding to the geographic information point sequence are in turn: P1, P2 and P3. It should be noted that the set of points of interest may be pre-stored locally in the electronic device or in a server connected to the electronic device remotely.

In some alternative implementations of the present embodiment, for each geographic information point sequence in the set of geographic information point sequences, the electronic device may extract region identifiers of regions where geographic information points in the geographical information point sequence located from a preset set of region identifiers, and determine a sequence consisting of each extracted region identifier as the element sequence corresponding to the geographic information point sequence. Here, the elements contained in the element sequence may be different from each other. The preset set of region identifiers may include the region identifiers of the regions where each geographic information point in the geographical information point sequence located. In this regard, a region may be a village, a town, a city, etc. The present embodiment does not limit the content with this respect. It should be noted that the preset set of region identifiers may be pre-stored locally in the electronic device or in a server connected to the electronic device remotely.

In some alternative implementations of the present embodiment, for each geographic information point sequence in the set of geographic information point sequences, the electronic device may extract grid identifiers of grids where geographic information points in the geographical information point sequence located from a preset set of grid identifiers, and determine a sequence consisting of each extracted grid identifier as the element sequence corresponding to the geographic information point sequence. Here, the elements contained in the element sequence may be different from each other. The preset set of grid identifiers may be a set of grid identifiers of grids divided by grid-partitioning a two-dimensional space in advance. The preset set of grid identifiers may be pre-stored locally in the electronic device or in a server connected to the electronic device remotely.

Step 203, learning, by utilizing a machine learning method based on the set of identifiers and the generated element sequences, to obtain a matrix for each identifier in the set of identifiers.

In the present embodiment, the electronic device may learn to obtain a matrix for each identifier in the set of identifiers by utilizing a machine learning method based on the set of identifiers and the element sequences generated in step 202. For example, the electronic device may, by utilizing the unsupervised sentence encoder model Skip-Thoughts in the machine learning method, input each element sequence and the identifier corresponding to the element sequence into the Skip-Thoughts model, so that the Skip-Thoughts model learns to encode the input element sequence and the identifier respectively into vector representations of fixed dimensions, and obtains the matrix in the process of learning. Here, the Skip-Thoughts model is an open source sentence encoder model, which can learn to encode the input sentences into vector representations of fixed dimensions, and may be used in tasks such as semantic relevance, interpretation detection and sentence emotion classification. It should be noted that since the Skip-Thoughts model is a well-known technology that has been widely studied and applied by far, detailed description thereof will be omitted.

In some alternative implementations of the present embodiment, for each element sequence in the element sequences, the electronic device may determine the element sequence as a to-be-processed element sequence, determine an identifier corresponding to the to-be-processed element sequence in the set of identifiers as a to-be-processed identifier and perform the following processing steps: map the to-be-processed element sequence to a vector sequence, and map the to-be-processed identifier to a vector to obtain an identifier vector; convert vectors in the vector sequence by utilizing a preset element converting matrix to obtain a first vector sequence, and convert the identifier vector by utilizing a preset identifier converting matrix to obtain a first identifier vector; extract at least one sub-vector sequence from the first vector sequence by performing the following steps at least once: extract continuously a preset number of vectors from the first vector sequence, shift right for one bit and then extract continuously the preset number of vectors, and construct a sub-vector sequence with the extracted vectors; for each sub-vector sequence in the at least one sub-vector sequence, determine vectors in the sub-vector sequence and an average value of the first identifier vector as a first vector associated with the sub-vector sequence, convert the first vector by utilizing a preset vector converting matrix to obtain a first converting vector, predict a value distribution of the first converting vector by a preset value distribution predicting model to optimize the preset identifier converting matrix, wherein the preset value distribution predicting model is used to characterize a corresponding relation between the first converting vector and the value distribution. The electronic device may determine the optimized preset identifier converting matrix as the matrix for identifiers in the set of identifiers, after the electronic device performing the processing steps described above for the element sequences and the set of identifiers.

Here, the electronic device may map the to-be-processed element sequence to a vector sequence and map the to-be-processed identifier to a vector to obtain an identifier vector by adopting the One-Hot Encoding. It should be noted that the One-Hot Encoding is also referred to as the one bit valid encoding, and its method is to use a N bit status register to encode N states, with each status having an independent register bit of its own, and only one bit is valid at any time. Since the One-Hot Encoding is a well-known technology that has been widely studied and applied by far, detailed description thereof will be omitted. It should be noted that the preset element converting matrix, the preset identifier converting matrix and the preset vector converting matrix may be artificially set, or may be generated by the electronic device by utilizing a preset algorithm. The present embodiment does not limit the content with this respect.

The preset value distribution predicting model may be the Softmax regression model. The Softmax regression model is a generalization of the Logistic regression model on multi-classification. Softmax regression is supervised and may be combined with unsupervised learning methods. Here, the Logistic regression model is a generalized linear regression analysis model, commonly used in fields such as data mining and economic forecast. The electronic device may predict the value distribution of the first converting vector by the Softmax regression model to realize a prediction to the vector removed from the sub-vector sequence (e.g., the vectors included in the sub-vector sequence are in turn P1, P2, P4 and P5, the vectors contained in the first vector sequence corresponding to the sub-vector sequence are in turn P1, P2, P3, P4 and P5, then the vector removed from the sub-vector sequence is P3). If the predicted value of predicting the value distribution of the first converting vector is not point to the removed vector, the electronic device may learn the parameters of the preset identifier converting matrix by the Cross-Entropy algorithm, and use the gradient descent method to train the parameters of the preset identifier converting matrix to achieve the optimization to the preset identifier converting matrix and achieve a correct prediction to the removed vector.

The Cross-Entropy algorithm is often used in simulation modeling of rare events, optimization of multi-peak functions, etc. The Cross-Entropy technology has been used to solve classic traveler problems, knapsack problems, shortest path problems, maximum cut problems, etc. The gradient descent method is an optimization algorithm, often referred to as the steepest descent method. The gradient descent method is one of the simplest and oldest methods to solve the unconstrained optimization problem, and the negative gradient direction is used as the search direction. The closer the gradient descent method is to the target value, the smaller the step length and the slower the progress. The gradient descent method is often used in machine learning and artificial intelligence to approximate the minimum deviation model recursively.

It should be noted that the Softmax regression model, the Logistic regression model and the Cross-Entropy algorithm are well-known technologies that have been widely studied and applied by far, and detailed description thereof will be omitted.

Step 204, generating, for each identifier in the set of identifiers, based on the identifier and the matrix, information of a user to which the geographic information point sequence indicated by the identifier belongs.

In the present embodiment, after obtaining the matrix, for each identifier in the set of identifiers, the electronic device may generate information of a user to which the geographic information point sequence indicated by the identifier belongs, based on the identifier and the matrix. For example, the product of the identifier vector obtained by performing One-Hot Encoding to the identifier and the matrix may be determined as the information of the user, or the generated information characterizing the corresponding relation between the identifier and the matrix may be determined as the information of the user. The present embodiment does not limit the content with this respect.

Alternatively, for each piece of information generated in step 204, the electronic device may store the information in association with the user identifier of the user to which the information belongs locally or in a server remotely connected to the electronic device.

Figure 3:
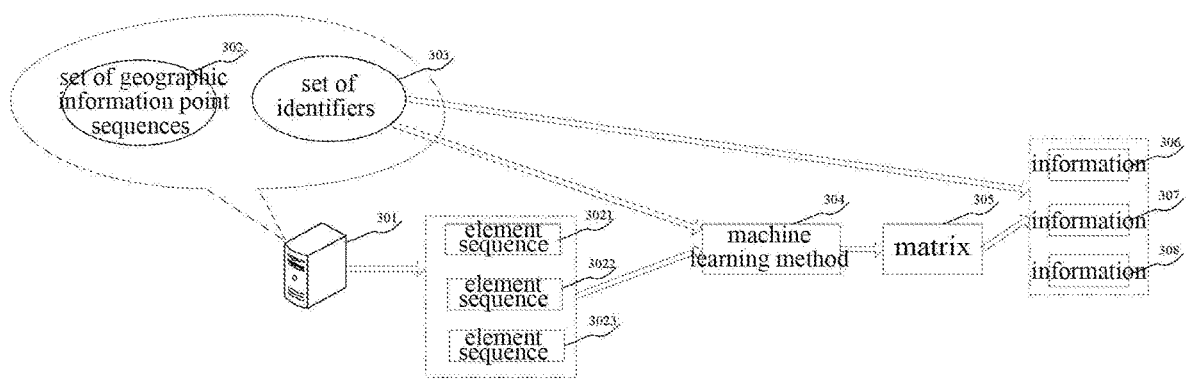
FIG. 3 is a schematic diagram of an application scenario of the method for generating information according to the present disclosure.

With further reference to FIG. 3, FIG. 3 is a schematic diagram of an application scenario of the method for generating information according to the present embodiment. In the application scenario of FIG. 3, the server 301 may periodically acquire from the local, the set of identifiers 303 consisting of the set of geographic information point sequences 302 and identifiers of each geographic information point sequence in the set of geographic information point sequences 302, wherein the set of geographic information point sequences 302 includes 3 geographic information point sequences. Then, for each geographic information point sequence in the set of geographic information point sequences 302, the server 301 may cluster the geographic information points in the geographic information point sequence and generate an element sequence corresponding to the geographic information point sequence. For example, the generated element sequences respectively corresponding to the geographic information point sequences in the set of geographic information point sequences 302 are 3021, 3022, and 3023. Then, the server 301 may learn to obtain the matrix 305 for identifiers in the set of identifiers 303 based on the set of identifiers 303 and the element sequences 3021, 3022 and 3023 by utilizing the machine learning method 304. Finally, for each identifier in the set of identifiers 303, the server 301 may generate, based on the identifier and the matrix 305, the information of the user to which the geographic information point sequence indicated by the identifier belongs. For example, the generated pieces of information respectively corresponding to the identifiers in the set of identifiers 303 are 306, 307 and 308.

The method provided by the embodiments of the present disclosure effectively utilizes the information of the user's offline behavior (i.e., the set of geographic information point sequences and the set of identifiers) and the unsupervised machine learning method, and realizes a targeted information generation.

Figure 4:
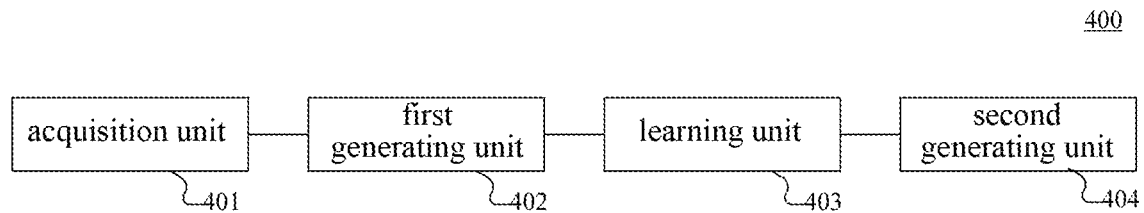
FIG. 4 is a schematic structural diagram of an embodiment of an apparatus for generating information according to the present disclosure.

With further reference to FIG. 4, as an implementation to the method illustrated in the above figures, the present disclosure provides an embodiment of an apparatus for generating information. The apparatus embodiment corresponds to the method embodiment shown in FIG. 2, and the apparatus may be specifically applied to various electronic devices.

As shown in FIG. 4, the apparatus 400 for generating information illustrated by the present embodiment includes: an acquisition unit 401, a first generating unit 402, a learning unit 403 and a second generating unit 404. The acquisition unit 401 is configured to acquire a set of identifiers consisting of a set of geographic information point sequences and identifiers of each geographic information point sequence in the set of geographic information point sequences. The first generating unit 402 is configured to, for each geographic information point sequence in the set of geographic information point sequences, cluster geographic information points in the geographic information point sequence and generate an element sequence corresponding to the geographic information point sequence, wherein each element in the element sequence corresponds to at least one geographic information point in the geographic information point sequence. The learning unit 403 is configured to learn, by utilizing a machine learning method based on the set of identifiers and the generated element sequences, to obtain a matrix for each identifier in the set of identifiers. And the second generating unit 404 is configured to generate, for each identifier in the set of identifiers, based on the identifier and the matrix, information of a user to which the geographic information point sequence indicated by the identifier belongs.

In the present embodiment, in the apparatus 400 for generating information: the specific processing and the technical effects thereof of the acquisition unit 401, the first generating unit 402, the learning unit 403 and the second generating unit 404 may refer to the related descriptions of the step 201, the step 202, the step 203 and the step 204 in the corresponding embodiment in FIG. 2 respectively, detailed description thereof will be omitted.

In some alternative implementations of the present embodiment, the first generating unit 402 includes: a first generating subunit (not shown in the figure), configured to for each geographic information point sequence in the set of geographic information point sequences, for each geographic information point in the geographic information point sequence, extract a point of interest with the shortest straight-line distance to the geographic information point from a pre-stored set of points of interest wherein points of interest contained are provided with identifiers, determine an identifier of the point of interest as an element corresponding to the geographic information point, determine an element sequence consisting of elements respectively corresponding to each geographic information point in the geographic information point sequence as the element sequence corresponding to the geographic information point sequence.

In some alternative implementations of the present embodiment, the first generating unit 402 includes: a second generating subunit, configured to for each geographic information point sequence in the set of geographic information point sequences, extract region identifiers of regions where geographic information points in the geographical information point sequence located from a preset set of region identifiers, determine a sequence consisting of each extracted region identifier as the element sequence corresponding to the geographic information point sequence, wherein the preset set of region identifiers includes the region identifiers of the regions where geographic information points in the geographical information point sequence located.

In some alternative implementations of the present embodiment, the first generating unit 402 includes: a third generating subunit, configured to for each geographic information point sequence in the set of geographic information point sequences, extract grid identifiers of grids where geographic information points in the geographical information point sequence located from a preset set of grid identifiers, determine a sequence consisting of each extracted grid identifier as the element sequence corresponding to the geographic information point sequence, wherein the preset set of grid identifiers is a set of grid identifiers of grids divided by grid-partitioning a two-dimensional space in advance.

In some alternative implementations of the present embodiment, the learning subunit 403 includes: a learning subunit (not shown in the figure), configured to for each element sequence in the element sequences, determine the element sequence as a to-be-processed element sequence, determine an identifier corresponding to the to-be-processed element sequence in the set of identifiers as a to-be-processed identifier and perform the following processing steps:

map the to-be-processed element sequence to a vector sequence, and map the to-be-processed identifier to a vector to obtain an identifier vector; convert vectors in the vector sequence by utilizing a preset element converting matrix to obtain a first vector sequence, and convert the identifier vector by utilizing a preset identifier converting matrix to obtain a first identifier vector; extract at least one sub-vector sequence from the first vector sequence by performing the following steps at least once: extract continuously a preset number of vectors from the first vector sequence, shift right for one bit and then extract continuously the preset number of vectors, and construct a sub-vector sequence with the extracted vectors; for each sub-vector sequence in the at least one sub-vector sequence, determine vectors in the sub-vector sequence and an average value of the first identifier vector as a first vector associated with the sub-vector sequence, convert the first vector by utilizing a preset vector converting matrix to obtain a first converting vector, predict a value distribution of the first converting vector by a preset value distribution predicting model to optimize the preset identifier converting matrix, wherein the preset value distribution predicting model is used to characterize a corresponding relation between the first converting vector and the value distribution; and a matrix determining subunit (not shown in the figure), configured to determine the optimized preset identifier converting matrix as the matrix.

In some alternative implementations of the present embodiment, the learning subunit 403 may include: a mapping module (not shown in the figure), configured to map the to-be-processed element sequence to a vector sequence and map the to-be-processed identifier to a vector to obtain an identifier vector by adopting One-Hot Encoding.

The apparatus provided by the embodiments of the present disclosure effectively utilizes the information of the user's offline behavior (i.e., the set of geographic information point sequences and the set of identifiers) and the unsupervised machine learning method, and realizes a targeted information generation.

Figure 5:
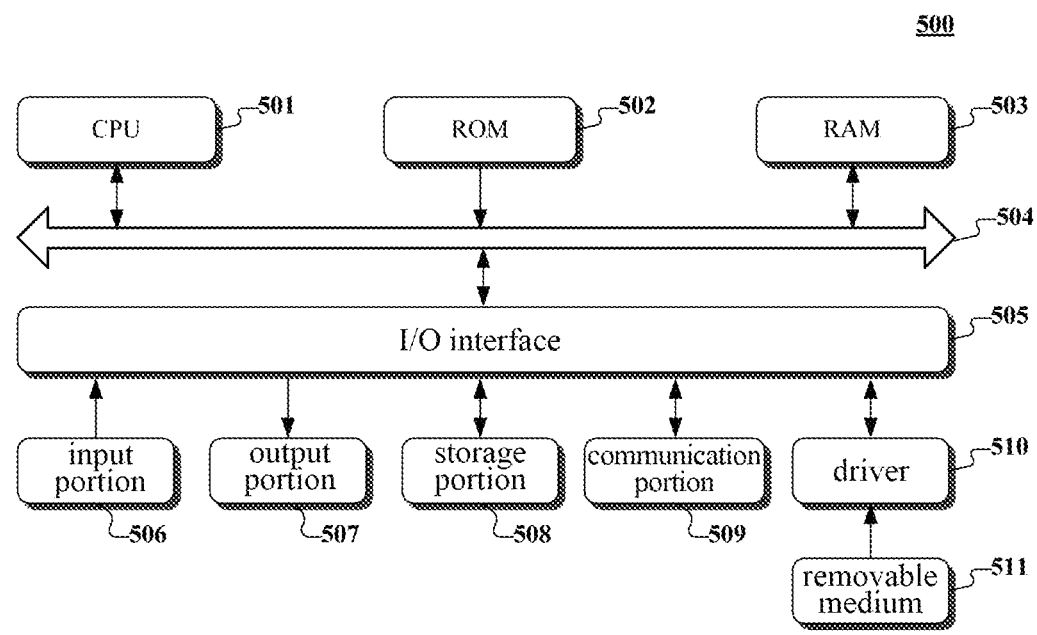
FIG. 5 is a schematic structural diagram of a computer system adapted to implement a server of embodiments of the present disclosure.

With reference to FIG. 5, a schematic structural diagram of a computer system 500 adapted to implement a data forwarding device of the embodiments of the present disclosure is illustrated. The data forwarding device shown in FIG. 5 is merely an example and should not impose any restriction on the functions and the scope of use of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the CPU 501, implements the functions as defined by the methods of the present disclosure.

It is to be noted that the computer readable medium in the present application may be computer readable signal medium or computer readable storage medium or the combination thereof. An example of the computer readable storage medium may include but not limited to: systems, devices or elements of electric, magnet, light, electromagnet, infrared ray, or semiconductor or the combination thereof. A more specific example of the computer readable storage medium may include but not limited to: electrical connections with one or more wire, portable computer disk, hard disk, random access memory (RAM), read only memory (ROM), erasable programmable read only memory (EPROM or flash memory), fibre, portable compact disk read only memory (CD-ROM), optical memory, magnet memory or the combination thereof. In the present application, the computer readable storage medium may be any physical medium containing or storing programs which can be used by a command execution system, a device or an elements or the incorporation thereof. In the present application, the computer readable signal medium may include data signal in the base band or propagating as parts of a carrier in which computer readable program codes are carried. A form of the propagated signal may include but not limited to: electromagnetic signal, optical signal or the combination thereof. The signal medium that can be read by computer may be any computer readable medium except for computer readable storage medium. The computer readable medium is capable of emitting, propagating or transmitting programs for an instruction execution system, a device or an element or the combination thereof. The program codes on the computer readable medium may be transported with any suitable medium including but not limited to: a wireless medium, a wire medium, an optical cable medium, a RF medium or any combination thereof.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved.

It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an acquisition unit, a first generating unit, a learning unit and a second generating unit, where the names of these units or modules do not in some cases constitute a limitation to such units or modules themselves. For example, the acquisition unit may also be described as "a unit for acquiring a set of geographic information point sequences and a set of identifiers comprising an identifier of each geographic information point sequence in the set of the geographic information point sequences."

In another aspect, the present application further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire a set of geographic information point sequences and a set of identifiers comprising an identifier of each geographic information point sequence in the set of the geographic information point sequences; for the each geographic information point sequence in the set of the geographic information point sequences, cluster geographic information points in the each geographic information point sequence and generate an element sequence corresponding to the each geographic information point sequence, wherein each element in the element sequence corresponds to at least one geographic information point in the each geographic information point sequence; learn, by utilizing a machine learning method based on the set of identifiers and the generated element sequences, to obtain a matrix for the identifiers in the set of identifiers; and generate, for each identifier in the set of identifiers, based on the identifier and the matrix, information of a user to which the geographic information point sequence indicated by the identifier belongs.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for generating information, comprising:
   acquiring a set of geographic information point sequences and a set of identifiers comprising an identifier of each geographic information point sequence in the set of the geographic information point sequences;
   for the each geographic information point sequence in the set of the geographic information point sequences, clustering geographic information points in the each geographic information point sequence and generating an element sequence corresponding to the each geographic information point sequence, wherein each element in the element sequence corresponds to at least one geographic information point in the each geographic information point sequence;
   learning, by utilizing a machine learning method based on the set of identifiers and the generated element sequences, to obtain a matrix for the identifiers in the set of identifiers; and
   generating, for each identifier in the set of identifiers, based on the identifier and the matrix, information of a user to which the geographic information point sequence indicated by the identifier belongs, comprising: determining an identifier vector obtained by performing One-Hot Encoding on the identifier, and determining a product of the identifier vector and the matrix as the information of the user to which the geographic information point sequence indicated by the identifier belongs.

2. The method according to claim 1, wherein the clustering geographic information points in the each geographic information point sequence and generating an element sequence corresponding to the each geographic information point sequence, for the each geographic information point sequence in the set of the geographic information point sequences, comprises:
   for the each geographic information point sequence in the set of the geographic information point sequences, for each geographic information point in the each geographic information point sequence, extracting a point of interest having a shortest distance to the each geographic information point from a pre-stored set of points of interest provided with identifiers, using an identifier of the point of interest as an element corresponding to the geographic information point, and using an element sequence comprising elements respectively corresponding to the geographic information points in the each geographic information point sequence as the element sequence corresponding to the geographic information point sequence.

3. The method according to claim 1, wherein the clustering geographic information points in the each geographic information point sequence and generating an element sequence corresponding to the each geographic information point sequence, for the each geographic information point sequence in the set of the geographic information point sequences, comprises:
   for the each geographic information point sequence in the set of the geographic information point sequences, extracting region identifiers of regions where the geographic information points in the each geographical information point sequence are located from a preset set of region identifiers, and using a sequence comprising the extracted region identifiers as the element sequence corresponding to the each geographic information point sequence, wherein the preset set of the region identifiers includes a region identifier of a region where each geographic information point in the each geographical information point sequence is located.

4. The method according to claim 1, wherein the clustering geographic information points in the each geographic information point sequence and generating an element sequence corresponding to the each geographic information point sequence, for the each geographic information point sequence in the set of the geographic information point sequences, comprises:

for the each geographic information point sequence in the set of the geographic information point sequences, extracting grid identifiers of grids where the geographic information points in the each geographical information point sequence are located from a preset set of grid identifiers, and using a sequence comprising the extracted grid identifiers as the element sequence corresponding to the each geographic information point sequence, wherein the preset set of grid identifiers is a set of grid identifiers of grids divided by grid-partitioning a two-dimensional space in advance.

5. The method according to claim 1, wherein the learning, by utilizing a machine learning method based on the set of identifiers and the generated element sequences, to obtain a matrix for the identifiers in the set of identifiers comprises:

for each element sequence in the element sequences, using the each element sequence as a to-be-processed element sequence, using an identifier in the set of identifiers corresponding to the to-be-processed element sequence as a to-be-processed identifier and performing following processing steps: mapping the to-be-processed element sequence to a vector sequence and mapping the to-be-processed identifier to a vector to obtain an identifier vector; converting vectors in the vector sequence by utilizing a preset element converting matrix to obtain a first vector sequence, and converting the identifier vector by utilizing a preset identifier converting matrix to obtain a first identifier vector; and extracting at least one sub-vector sequence from the first vector sequence by performing following steps at least once: extracting continuously a preset number of vectors from the first vector sequence, right-shifting one bit and extracting continuously the preset number of vectors, and constructing a sub-vector sequence by using the extracted vectors; for each sub-vector sequence in the at least one sub-vector sequence, using vectors in the sub-vector sequence and an average value of the first identifier vector as a first vector associated with the sub-vector sequence, converting the first vector by utilizing a preset vector converting matrix to obtain a first converting vector, and predicting a value distribution of the first converting vector by a preset value distribution predicting model to optimize the preset identifier converting matrix, wherein the preset value distribution predicting model is used to characterize a corresponding relation between the first converting vector and the value distribution; and using the optimized preset identifier converting matrix as the matrix.

6. The method according to claim 5, wherein the mapping the to-be-processed element sequence to a vector sequence and mapping the to-be-processed identifier to a vector to obtain an identifier vector comprises:

mapping the to-be-processed element sequence to a vector sequence and mapping the to-be-processed identifier to a vector to obtain an identifier vector, by adopting One-Hot Encoding.

7. A computer readable storage medium storing a computer program, which when executed by a processor, causes the processor to perform the method according to claim 1.

8. The method according to claim 1, wherein for each geographic information point sequence in the set of geographic information point sequences, the identifier of the geographic information point sequence is a user identifier of the user to which the geographic information point sequence belongs.

9. An apparatus for generating information, comprising:
at least one processor; and
a memory storing instructions, which when executed by the at least one processor, cause the at least one processor to perform operations, the operations comprising:

acquiring a set of geographic information point sequences and a set of identifiers comprising an identifier of each geographic information point sequence in the set of the geographic information point sequences;

for the each geographic information point sequence in the set of the geographic information point sequences, clustering geographic information points in the each geographic information point sequence and generating an element sequence corresponding to the each geographic information point sequence, wherein each element in the element sequence corresponds to at least one geographic information point in the each geographic information point sequence;

learning, by utilizing a machine learning method based on the set of identifiers and the generated element sequences, to obtain a matrix for the identifiers in the set of identifiers; and generating, for each identifier in the set of identifiers, based on the identifier and the matrix, information of a user to which the geographic information point sequence indicated by the identifier belongs, comprising: determining an identifier vector obtained by performing One-Hot Encoding on the identifier, and determining a product of the identifier vector and the matrix as the information of the user to which the geographic information point sequence indicated by the identifier belongs.

10. The apparatus according to claim 9, wherein the clustering geographic information points in the each geographic information point sequence and generating an element sequence corresponding to the each geographic information point sequence, for the each geographic information point sequence in the set of the geographic information point sequences, comprises:

for the each geographic information point sequence in the set of the geographic information point sequences, for each geographic information point in the each geographic information point sequence, extracting a point of interest having a shortest distance to the each geographic information point from a pre-stored set of points of interest provided with identifiers, using an identifier of the point of interest as an element corresponding to the geographic information point, and using an element sequence comprising elements respectively corresponding to the geographic information points in the each geographic information point sequence as the element sequence corresponding to the geographic information point sequence.

11. The apparatus according to claim 9, wherein the clustering geographic information points in the each geographic information point sequence and generating an element sequence corresponding to the each geographic information point sequence, for the each geographic information point sequence in the set of the geographic information point sequences, comprises:

for the each geographic information point sequence in the set of the geographic information point sequences, extracting region identifiers of regions where the geographic information points in the each geographical information point sequence are located from a preset set of region identifiers, and using a sequence comprising the extracted region identifiers as the element sequence corresponding to the each geographic information point sequence, wherein the preset set of the region identifiers includes a region identifier of a region where each geographic information point in the each geographical information point sequence is located.

12. The apparatus according to claim 9, wherein the clustering geographic information points in the each geographic information point sequence and generating an element sequence corresponding to the each geographic information point sequence, for the each geographic information point sequence in the set of the geographic information point sequences, comprises:

for the each geographic information point sequence in the set of the geographic information point sequences, extracting grid identifiers of grids where the geographic information points in the each geographical information point sequence are located from a preset set of grid identifiers, and using a sequence comprising the extracted grid identifiers as the element sequence corresponding to the each geographic information point sequence, wherein the preset set of grid identifiers is a set of grid identifiers of grids divided by grid-partitioning a two-dimensional space in advance.

13. The apparatus according to claim 9, wherein the learning, by utilizing a machine learning method based on the set of identifiers and the generated element sequences, to obtain a matrix for the identifiers in the set of identifiers comprises:

for each element sequence in the element sequences, using the each element sequence as a to-be-processed element sequence, using an identifier in the set of identifiers corresponding to the to-be-processed element sequence as a to-be-processed identifier and performing following processing steps: mapping the to-be-processed element sequence to a vector sequence and mapping the to-be-processed identifier to a vector to obtain an identifier vector; converting vectors in the vector sequence by utilizing a preset element converting matrix to obtain a first vector sequence, and converting the identifier vector by utilizing a preset identifier converting matrix to obtain a first identifier vector; and extracting at least one sub-vector sequence from the first vector sequence by performing following steps at least once: extracting continuously a preset number of vectors from the first vector sequence, right-shifting one bit and extracting continuously the preset number of vectors, and constructing a sub-vector sequence by using the extracted vectors; for each sub-vector sequence in the at least one sub-vector sequence, using vectors in the sub-vector sequence and an average value of the first identifier vector as a first vector associated with the sub-vector sequence, converting the first vector by utilizing a preset vector converting matrix to obtain a first converting vector, and predicting a value distribution of the first converting vector by a preset value distribution predicting model to optimize the preset identifier converting matrix, wherein the preset value distribution predicting model is used to characterize a corresponding relation between the first converting vector and the value distribution; and using the optimized preset identifier converting matrix as the matrix.

14. The apparatus according to claim 13, wherein the mapping the to-be-processed element sequence to a vector sequence and mapping the to-be-processed identifier to a vector to obtain an identifier vector comprises:

mapping the to-be-processed element sequence to a vector sequence and mapping the to-be-processed identifier to a vector to obtain an identifier vector, by adopting One-Hot Encoding.

15. The apparatus according to claim 9, wherein for each geographic information point sequence in the set of geographic information point sequences, the identifier of the geographic information point sequence is a user identifier of the user to which the geographic information point sequence belongs.

* * * * *